Jan. 15, 1946.   J. C. HAYES   2,393,162
BUSINESS MANAGEMENT ANALYZER
Original Filed Feb. 18, 1944
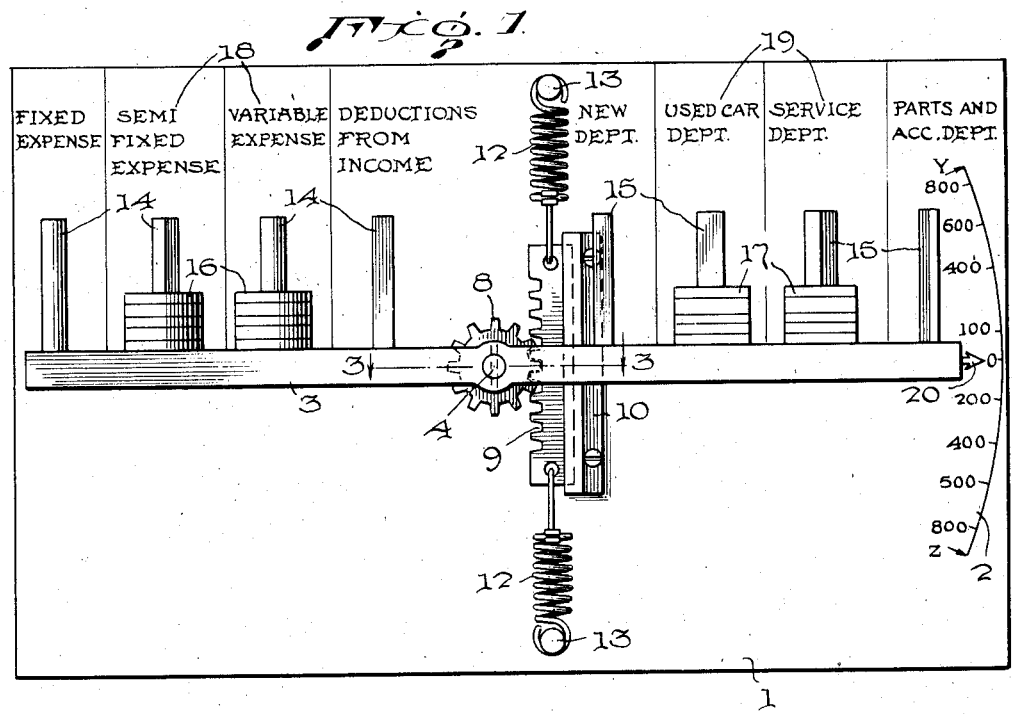
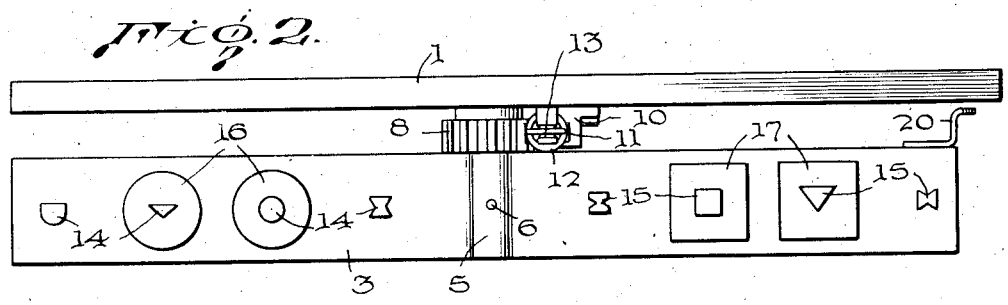
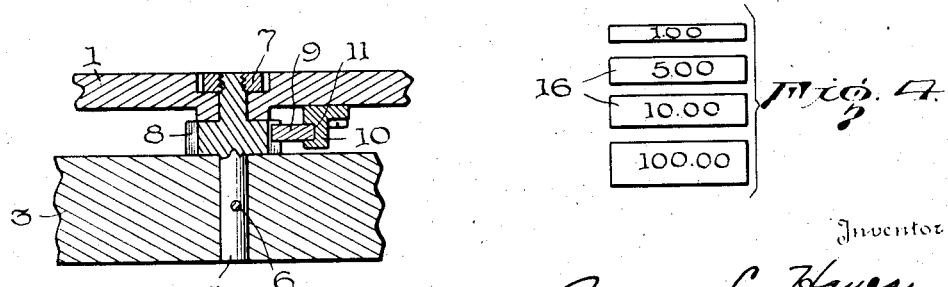
Inventor
James C. Hayes
By Robert Cobb
Attorneys Patented Jan. 15, 1946

2,393,162

UNITED STATES PATENT OFFICE 2,393,162

BUSINESS MANAGEMENT ANALYZER

James Clement Hayes, Shelbyville, Tenn.

Continuation of application Serial No. 522,892, February 18, 1944. This application April 24, 1944, Serial No. 532,468

4 Claims. (Cl. 235—61)

This invention relates to accessories for use in connection with business management and/or analysis, and more especially to a simple and efficient device for automatically and quickly indicating the financial status or condition of a business, in which the expenses and gross profits are respectively represented by a system of mechanical couples or forces acting in opposite directions about a common center so as to produce motion of an indicator controlled thereby. In its broad aspect, the device operates on the principle of a spring balance, the scale of which represents the running profit or loss according to the position of a movable balance arm associated with the scale aforesaid.

The present application constitutes a continuation of my prior application, Serial No. 522,892, filed February 18, 1944, in which the operation of the invention was described in relation to its use by automobile dealers, gasoline service stations, garages, and similar businesses. It is to be understood, however, that its use is not confined to those businesses particularly mentioned, since other adaptations will be readily apparent from the following description which refers to an automobile dealer business merely by way of illustration.

A further object of my invention is to provide a device of the foregoing character which is composed of a normally balanced pivotal support or carrier having an indicator at one end thereof arranged in cooperative relation to a fixed scale graduated in predetermined units numerically increasing in opposite directions from the midpoint of the scale, and a series of checks or chips which may be deposited on the pivotal support or carrier at suitable intervals therealong, according to a predetermined system of values representing various items of expense and profits respectively of a business. Thus by placing the chips or checks representing the expense items at one side of the pivotal axis of the support or carrier, and those representing the gross profits at the opposite side of the pivotal axis aforesaid, a mechanical balance is automatically established and the indicator will quickly assume a position in relation to the fixed scale that the profit or loss of the business may be directly read from the scale.

Other and further objects and advantages of the invention will be hereinafter described and the novel features thereof defined by the appended claims.

In the drawing:

Figure 1 is a view in front elevation of a device constructed in accordance with my invention, as adapted for use in managing or analyzing an automobile dealer business;

Figure 2 is a top plan view of the device shown in Figure 1;

Figure 3 is a fragmentary horizontal sectional view taken on the line 3—3 of Figure 1, with the balance lever spindle shown in plan; and Figure 4 is a detailed view illustrating in side elevation one of a series of checks or chips which are used to represent the expense and profit items of the business.

Like reference characters designate corresponding parts in the several figures of the drawing, wherein I denotes an elongated upright support or baseboard having at one end thereof a scale 2 graduated in predetermined units numerically increasing in opposite directions from the zero or mid-point of the scale, on the arc Y, Z. The graduations may be suitably varied in number and value according to the nature and volume of the business for which the apparatus is used, and according to whether the analysis is to be made on a daily, weekly, monthly, or other periodical basis.

Pivitally mounted on the support or baseboard I is a carrier or balance arm 3, said balance arm extending in opposite directions from its pivotal axis 4. Any suitable means may be utilized for pivotally mounting the carrier on the support I. As shown in the drawing, said means comprises a transverse stud 5 extending laterally through the balance arm 3 and fixed thereto by means of a pin 6, or in some other manner, as by means of a key, so that the stud 5 is rotatable with the balance arm 3 about the axis 4 which coincides with the center of the stud 5. The stud 5 is laterally extended loosely through the support or baseboard I, and at its rear end, a nut 7 or other suitable means may be employed to hold the stud and balance arm in assembled relation to the support I, with the stud free to turn in the support.

The balance arm or carrier 3 is normally balanced in a horizontal position as shown in Figure 1, this being accomplished in any suitable manner. According to the balancing means shown in the accompanying drawing by way of illustration, the same includes a toothed pinion 8 formed integral with or otherwise fixed to the stud 5 for rotation therewith, and a cooperating toothed rack 9 disposed at one side of the pinion and meshing therewith. The rack 9 is free to move endwise in an upward and downward direction, as will be obvious from the drawing, and if desired, a guide member 10 having a groove 11 therein may be fixed to the support or baseboard 1 in cooperative relation to the rack to guide the rack in its upward and downward movements and to maintain the same in meshing engagement with the pinion 8. Each end of the rack 9 is connected to a spring 12, with the opposite ends of the respective springs 12, 12 in turn attached to pins or posts 13, 13 adjacent to the upper and lower edges respectively of the support 1. The pull exerted upon the rack 9 by the respective springs 12, 12 is equal and in opposite directions, so that the rack will normally assume the position shown in Figure 1 of the drawing, with the balance arm 3 lying in a horizontal position and hence perfectly balanced. However, by applying weights or forces to the balance arm 3 at opposite sides of the pivotal axis 4, the balance arm is freely movable about its axis according to the value and location of the weights. Thus the balance arm or carrier 3 may be caused to assume an inclined position, as permitted by the yielding action of the springs 12, 12.

In adapting the advice to the analysis of the financial management or condition of a business, such as an automobile dealer business, the balance arm or carrier 3 is provided at its upper side with a series of spaced pegs or pins 14, 15, the pins 14 being located at one side of the pivotal axis 4, and the pins 15 being located at the opposite side. The respective pins are adapted to receive thereon a series or group of checks or chips designated 16, 17, as best shown in Figures 1 and 2. For convenience of financial analysis, the chips or checks 16, 17 represent dollars in terms of inch-ounces. As shown in the drawing, the chips or checks 16 are circular and represent expenses, while the chips or checks 17 are square and represent gross profits. Each of the pins or pegs 14 represents a particular type of expense, and correspondingly each peg 15 represents a particular type of profit, as identified by suitable indicia or legends 18 and 19 depicted upon the support or baseboard 1 above the respective pegs. The various pins or pegs 14, 15 are of different shape and/or color, and the chips are in turn provided with apertures of corresponding shape so that the chips can be placed only on one specific peg, thus making it impossible for the user to place the chips on the wrong pegs and hence mix the accounts. As a further aid to the user, the chips or checks of the above groups can be colored corresponding to the colors of the respective pegs 14, 15, and for ease in identifying the value of the respective chips, their value may be marked on the edges thereof as shown in Figure 4. Other identifying characteristics, in addition to color and shape, may be utilized for convenience of identification of the accounts, in relation to the pegs and chips, as will be obvious from the foregoing description.

As previously mentioned, the expense accounts represented by the pegs and chips 14, 16 are arranged at the lefthand side of the pivotal axis of the balance arm 3, as seen in Figures 1 and 2, and the gross profit accounts represented by similar pegs and chips 15, 17 are arranged at the righthand side of the pivotal axis of the balance arm. The expense accounts preferably fall under four headings, designated 18, and the gross profits fall under four headings, designated 19, but it is to be understood that the number of headings selected for a given business may be varied at will.

In the use of the business management analyzer, on the first day of each month the fixed expense and known semi-fixed expense chips are posted on the proper pegs 14 under the appropriate heading 18. Variable expenses and deductions from income are posted as they occur, by the application of the corresponding chips or checks to the appropriate pegs under the designated headings. The gross profit of each department is figured at the end of the day's business and posted at that time by the application of the chips or checks 17 to the pegs 15 under the designated headings 19, whereupon the balance arm 3 will assume a position such that the indicator 20 carried by the righthand end of the balance arm will indicate the financial status, such as the profit or loss analysis, of the business according to the scale 2 with which the indicator cooperates. Should the indicator coincide with the zero reading on the scale, the business will have reached a break-even point, while the readings between O Y will represent a loss, and the readings between O Z will represent a profit. All postings are preferably made in dollars and cents may be carried over to the following day. As the postings occur from day to day, or from week to week, or from month to month, according to the period selected for the desired analysis, the indicator 20 will automatically and quickly indicate the status of the business.

Having in view that the forces or weights represented by the chips or checks would ordinarily have a greater or less effect upon the balance arm according to the greater or less distance they are disposed from the pivotal axis or fulcrum of the balance arm, I prefer to make the different groups of chips of different materials in order that they will have the same balancing effect irrespective of their distance from the fulcrum. For example, the chips that are to be applied to the two pegs 14, 15 nearest to the pivotal axis 4, on opposite sides thereof, may be made of lead or some other relatively heavy material, while those chips applied to the pegs which are the most remote from the pivotal axis 4, may be made of paper, cardboard or some other relatively light material. The other chips intermediate these extremes will be proportionately lighter in weight as their distance increases from the pivotal axis 4, through the appropriate selection of materials from which these chips are made. Thus, a chip representing the value of one dollar and placed on the peg at either extreme end of the balance arm 3, which may be ten inches from the fulcrum 4, may weigh only one-tenth of an ounce, while for the same value of one dollar, the chip on either of the innermost pegs, which may be only one inch from the fulcrum, should weigh one ounce. In both cases the balancing effect of the chips would be equivalent to one inch-ounce. The same principle applies to the chips intermediate these extremes.

It will be obvious from the foregoing that to calibrate the scale 2, some suitable units of measurement must be chosen so that the product of the unit weight of the chips and the distance from the fulcrum 4 the chips are placed on the balance lever 3 equals the units in dollars on the scale 2. Thus, for example, if a one-ounce chip is placed one inch from the fulcrum, the product one-inch-ounce may be used to represent one unit or one dollar on the scale. Correspondingly, a one-ounce chip placed ten inches from the fulcrum would equal ten-inch-ounces or ten dollars on the scale. In calibrating the scale, chips may be placed on the pegs first on one side of the fulcrum and then on the other, varying the number and/or total weight on the pegs so that the product of the weight and distance or distances from the fulcrum corresponds to the desired units that are to be represented on the scale as determined by the positions assumed by the indicator 20. By making a series of variations in the total weight and/or position of the chips, the balance lever will be caused to assume different positions relative to the scale 2, and the scale can be marked accordingly.

By the same token, chips of greater denomination in the same group will have a proportionately greater weight, which may be attained by suitable selection of materials from which the chips are made.

While the specific details have been herein shown and described, my invention is not confined thereto as changes and alterations may be made without departing from the spirit thereof as defined by the appended claims.

I claim:

1. A device of the class described, comprising an elongated upright support having a scale at one end thereof graduated in predetermined units numerically increasing in opposite directions from the mid-point of the scale, a balance lever pivotally mounted on the support and extended in opposite directions from its pivotal axis, said balance lever having an indicator at one end thereof disposed in cooperative relation to the scale aforesaid, resilient means acting upon the balance lever to normally cause the same to assume a position with the indicator registering with the mid-point of the associated scale, a series of check-supporting means arranged in spaced relation to each other along the balance lever, at opposite sides of the pivotal axis thereof, and a plurality of checks selectively receivable by the check-supporting means, said checks acting upon the balance lever and resilient means aforesaid to cause the indicator to selectively assume positions of registration with the scale graduations in conformance with the effective weight and distribution of the checks on opposite sides of the pivotal axis of the balance lever.

2. A device as defined in claim 1, wherein the resilient means for normally balancing the balance lever at the mid-point of the scale includes a toothed pinion which is rotatable responsive to unbalancing of the balance lever through the depositing of the checks on the balance lever, a toothed rack meshing with the pinion and freely movable endwise, and spring means connected respectively to the opposite ends of the rack and normally acting thereon through the pinion to balance the balance lever.

3. A device as defined in claim 1, wherein the check supporting means comprises a plurality of upwardly extended pegs arranged at spaced intervals along the balance lever and at opposite sides of the pivotal axis of the latter, and the checks are each provided with an aperture to receive the pegs when the checks are deposited on the balance lever, the pegs and check apertures being of varying cross sectional configuration such that the checks for the respective pegs are not interchangeable.

4. A device as claimed in claim 1, wherein the checks of equal denomination associated with the respective check-supporting means are of different weights in inverse proportion to their distance from the pivotal axis of the balance lever.

JAMES CLEMENT HAYES.